United States Patent
Maida-Smith et al.

(10) Patent No.: US 8,881,230 B2
(45) Date of Patent: Nov. 4, 2014

(54) SECURE SOCIAL WEB ORCHESTRATION VIA A SECURITY MODEL

(71) Applicants: Kathy Maida-Smith, Houston, TX (US); Steven W. Engle, Garland, TX (US); Michael J. Nieves, Seabrook, TX (US)

(72) Inventors: Kathy Maida-Smith, Houston, TX (US); Steven W. Engle, Garland, TX (US); Michael J. Nieves, Seabrook, TX (US)

(73) Assignee: Metasecure Corporation, Houston, TX (US)

(*) Notice: Subject to any disclaimer, the term of this patent is extended or adjusted under 35 U.S.C. 154(b) by 0 days.

(21) Appl. No.: 14/151,461

(22) Filed: Jan. 9, 2014

(65) Prior Publication Data
US 2014/0165138 A1  Jun. 12, 2014

Related U.S. Application Data

(63) Continuation of application No. 13/292,502, filed on Nov. 9, 2011, now Pat. No. 8,661,504.

(60) Provisional application No. 61/438,799, filed on Feb. 2, 2011, provisional application No. 61/532,515, filed on Sep. 8, 2011.

(51) Int. Cl.
*G06F 21/10* (2013.01)
*G06F 21/31* (2013.01)
*G06F 21/62* (2013.01)

(52) U.S. Cl.
CPC .............. *G06F 21/10* (2013.01); *G06F 21/316* (2013.01); *G06F 21/6272* (2013.01)
USPC .................. 726/1; 726/2; 726/27; 705/14.55; 705/14.51; 705/2; 705/51; 709/201; 709/217; 709/227; 709/228; 709/229

(58) Field of Classification Search
CPC .... G06F 21/10; G06F 21/316; G06F 21/6272
USPC ........... 726/1, 2, 27; 705/14.55, 14.51, 14.44, 705/3, 14.64, 2, 14.14, 14.23, 14.25, 14.53, 705/14.66, 51; 709/201, 217, 227–229, 246
See application file for complete search history.

(56) References Cited

U.S. PATENT DOCUMENTS

| 7,499,937 B2 * | 3/2009 | Maida-Smith et al. ............... 1/1 |
| 7,634,466 B2 * | 12/2009 | Rose et al. ............................ 1/1 |
| 7,647,627 B2 * | 1/2010 | Maida-Smith et al. .......... 726/12 |
| 2007/0038610 A1 * | 2/2007 | Omoigui ........................... 707/3 |

* cited by examiner

*Primary Examiner* — Saleh Najjar
*Assistant Examiner* — Oleg Korsak
(74) *Attorney, Agent, or Firm* — Conley Rose, P.C.

(57) ABSTRACT

A method includes receiving, by a first computer, input from a first user. The method further includes creating, by the first computer, a hierarchical class tree implementing security profiles based on the input from the user. The hierarchical class tree identifies data, actions, and behaviors pertaining to content, and the security profiles restrict access and use of that user's content. The method also includes transmitting, by the first computer, a portion of the hierarchical class tree to a second computer. A corresponding apparatus is also provided.

15 Claims, 9 Drawing Sheets

US 8,881,230 B2

SECURE SOCIAL WEB ORCHESTRATION VIA A SECURITY MODEL

PRIORITY

This application is a continuation of U.S. patent application Ser. No. 13/292,502, filed Nov. 9, 2011, which claims priority to U.S. Provisional Patent Application Ser. Nos. 61/438,799, filed Feb. 2, 2011, entitled "Declaring, Maintaining and Sharing a Personal Identity Data Center," and 61/521,515, filed Aug. 9, 2011, entitled "Metalloria Class Tree Prototype Model Applied to a Secure Social Web," each of which is incorporated by reference in its entirety.

BACKGROUND

Today hundreds of millions of Internet users are using thousands of social web sites to stay connected with their friends, discover new friends and acquaintances, and to share user-created content (UCC). UCC is any digital material developed and authored by an individual, located anywhere and in any form. That individual owns the rights to the created UCC, examples of which include, but are not limited to, photos, videos, documents, sound/audio, social bookmarks, and blogs. Beyond the individual, social web sites have become a powerful additional means that organizations, business and non-profit, use to market their products and services and manage customer relationships. Organizations post their UCC, such as product release announcements, photos, and videos, to such sites; they also monitor and respond to both positive and negative comments by members about their products and services. Member comments and the organization responses are both UCC as well. Since social web sites provide a rich set of features for the online networking and sharing of UCC, businesses are now using social web sites, hosted either externally or internally, to extend a layer of social capabilities across the business to engage employees, customers, and partners at all levels. Such use is commonly referred to a business, or enterprise, social web.

Social web sites, internal or external, offer a form of security, usually in the guise of "privacy controls", to allow a user (individual or organizational) to control the visibility and sharing of his UCC. The user, whose UCC has been posted to or authored at the web site, is forced to rely on whatever security, assuming there even is security, that is offered by each particular web site. The type and level of security varies from web site to web site, and the user has no choice in the type of security that is provided and that is offered by the hosting social web site. And even if the user finds the security offered by a particular web site satisfactory, only that web site is obligated to abide by its security policy and controls; its security can not extend beyond the web site, nor can it be allianced with the security policy and controls of another to extend the user's ability to control the distribution of his/his/their UCC beyond the web site. If a person were to download the user's UCC from the web site, that person would not be required to abide by any particular security policy.

BRIEF DESCRIPTION OF THE DRAWINGS

For a detailed description of exemplary embodiments of the disclosure, reference will now be made to the accompanying drawings in which.

NOTATION AND NOMENCLATURE

Figure 1:
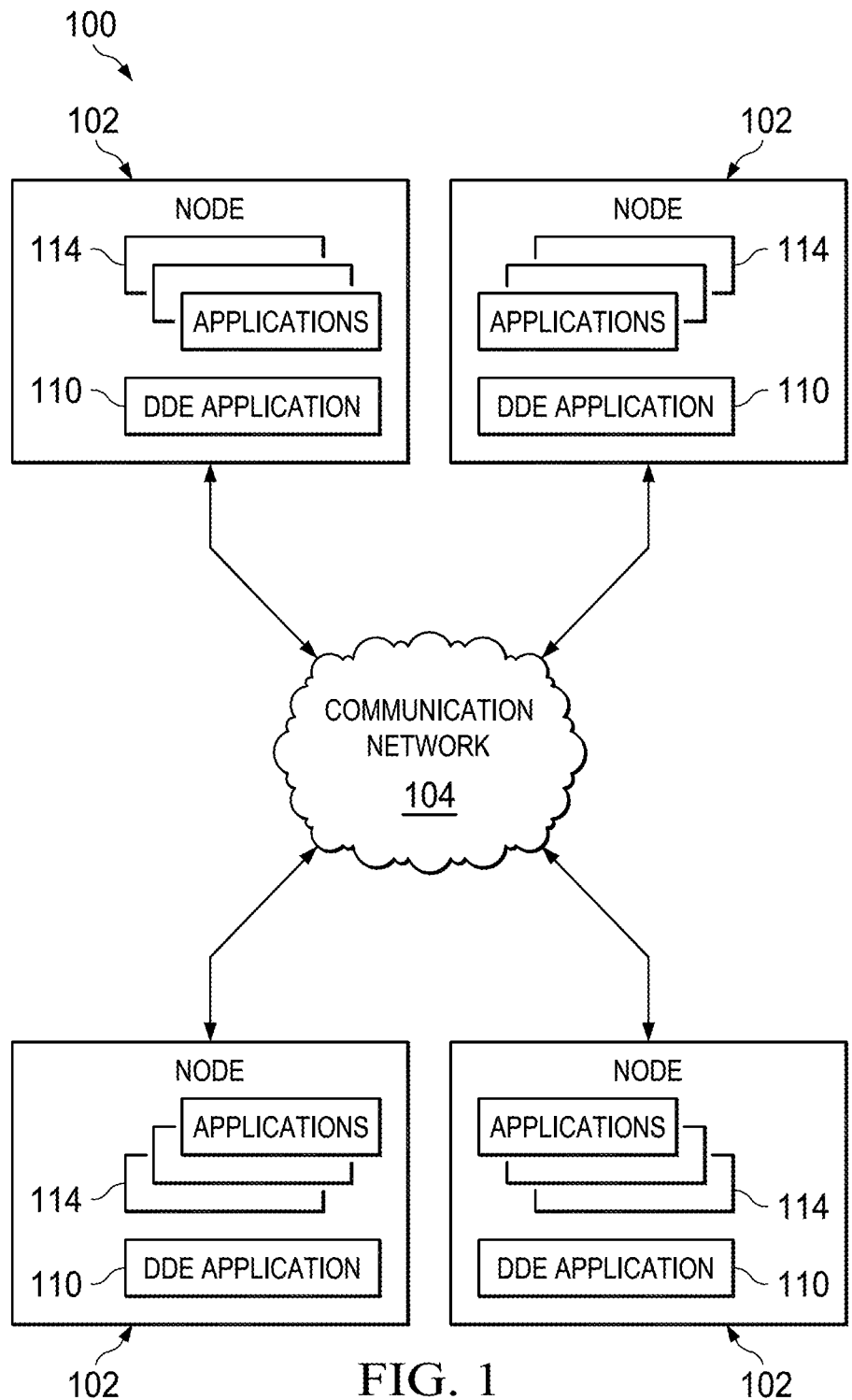
FIG. 1 illustrates a secure social web in accordance with various embodiments of the invention.

Certain terms are used in the following description and claims to refer to particular system components. As one skilled in the art will appreciate, computer or software companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

The term "first-party individual" refers to the person or organization that is a unique secure social web user. A first-party individual may be an individual or any form of organization, such as company, loosely formed organization, or subset (e.g., department) of a company or organization.

The term "user created content", or UCC, refers to any digital material developed and authored by a first-party individual, located anywhere and in any form.

The term "digital rights" describes the ability of a first-party individual to legitimately define and perform actions to control access to, the distribution and redistribution of, and the use and manipulation of, UCC on part of others.

A "digital rights policy" is a defined set of constraints on functions and flow among systems creating, storing, transporting, processing, offering, or allowing access to UCC, specified within the context and mechanism of "digital rights".

A "social web site" is an Intranet or Internet hosted web site, centralized or distributed, that hosts a social web, accessed using standard web protocols via a user's web browser.

A "social web" is an amalgamation of social networking and social media, an online social gathering place for people. It offers features that allow a person to stay connected with other people in online communities (a social networking function) and functions for the sharing of UCC.

A "business social web" is a social web solution focused on the enterprise, designed to extend a layer of social capabilities across the business to engage employees, customers, and partners at all levels. Almost always deployed internally and made externally accessible through an Internet firewall.

A "class" used within the context of hierarchical class tree structure (FIG. 4) is a definition, or blueprint, of all instances of a specific type. A class defines the structure and behavior of an instance.

"Inheritance", within the context of hierarchical class tree structure (FIG. 4), is the act of a class inheriting the attributes and behavior of a pre-existing class, generally of its parent class, which itself has inherited the attributes and behavior of its parent, and so on.

"Refinement", within the context of hierarchical class tree structure (FIG. 4), is the act of a class adding to, replacing, or modifying the attributes and behavior inherited from its parent class, to add further granularity and definition unique to this class (a subclass of its parent).

DETAILED DESCRIPTION

Introduction

The embodiments of the invention described herein provide the ability for the first-party individual, a secure social web site user, to declare, maintain, and share a data dictionary enabled secure social web site, one continuously and inexorably linked to the first-party individual yet interoperable with the information systems of other parties, be they other secure social web site users or organizations that host or operate that, or other, secure social web site hosting environments. The preferred data dictionary enabled secure social web site described herein provides a high level of rights scrutiny for the first-party individual, enabling effective and flexible protection of the first parties' UCC.

As a broad overview, each first-party individual is able to create and manage a hierarchical "tree." That individual's tree includes information about that individual and that identifies data, actions, and behaviors. For example, an individual's tree may identify that individual's friends or acquaintances, what photographs such people are entitled to view, whether and how the individual's documents, photographs, audio files, etc. are able to be distributed and/or redistributed by others, etc. The individual is in full control over the relationships between his content and other people and organizations, as well as the corresponding security (e.g., by way of a security profile), as defined by that person's digital rights policy. The hierarchical tree contains security profiles that restrict the access and use of the individual's UCC. Segments of the individual's tree can be provided to other users. Such receiving users can then access the individual's UCC but only as permitted, or not, by the security profiled embedded in the transferred individual's tree segment. This sharing of segments, the propagation of the first-party individual's digital rights over his UCC to users and social web sites other than his own, ensures that the distribution of his UCC is always controlled as specified by the first-party individual. The embodiments described herein greatly expand the ability to enforce security over UCC vis-à-vis previously known security paradigms.

Each user is provided with a data dictionary engine (DDE) application that runs on a device such as a computer, smart phone, personal digital assistant, etc. that implements and enforces the hierarchical tree structure for each such individual and, and through interaction with other DDE instances, shares tree portions with other users' DDE applications. The DDE application thus is the mechanism that permits each individual to be in control of his own UCC, independent of location, via the application and sharing of his UCC digital rights policy across multiple secure social web sites, versus having to abide to the site-specific policy of the organization hosting or operating each social web site he/she is a member of.

By way of an example, if an individual posts a photograph to a web site, the viewing and distribution of that photograph is controlled by a security profile that the individual (i.e., the owner of the photograph) specifies in his own tree. Consequently, the individual is not beholden to whatever security settings a web site to which the individual posts the photograph may or may not offer. The embodiments described herein essentially reverse the role of who is in control of security vis-à-vis previously known security paradigms.

The hierarchical tree can be implemented in a variety of contexts. One such example is a secure social web, although the use of the trees in other contexts is possible as well. A secure social web includes an amalgamation of social networking and social media, an online social gathering place for people. It offers features that allow a person to stay connected with other people in online communities (a social networking function) and functions for the sharing of user created content (a social media function).

The hierarchical tree may also be used to implement a secure business social web as well. A business social web focuses on an enterprise and extends a layer of social capabilities across the business to engage employees, customers, and partners at various levels. The business social web may be deployed internal to the business and made accessible through a firewall.

Web Service Concepts

Web services are typically application programming interfaces (API) or web APIs that can be accessed over a network, such as the Internet, and executed on a remote system hosting the requested services. In common usage the term refers to clients and servers that communicate over the Hypertext Transfer Protocol (HTTP) protocol used on the web. Such services tend to fall into one of two camps: SOAP and RESTful Web Services. SOAP based Web Services use Extensible Markup Language (XML) messages that follow the Simple Object Access Protocol (SOAP) standard and have been popular with traditional enterprise. In such systems, there is often a machine-readable description of the operations offered by the service written in the Web Services Description Language (WSDL). More recently, REpresentational State Transfer (REST) web services have been regaining popularity, particularly with Internet companies. By using the PUT, GET and DELETE HTTP methods, alongside POST, these are often better integrated with HTTP and web browsers than SOAP-based services. They do not require XML messages or WSDL service-API definitions.

Each web service further implements a public interface described in WSDL. The interface is an XML-based service description on how to communicate using the given web service.

Web service information is published using a standard protocol referred to as Universal Description, Discovery Integration ("UDDI"). UDDI enables applications to automatically discover, and/or look up web services information in order to determine whether to access and invoke them, analogous to the manner in which a Yellow Pages phone book enables users to discover business services and how to access them. The UDDI registry indicates, for each service on the network, 1) the identity of the service, the Uniform Resource Locator ("URL") of the service, and what the service does.

System Overview

Referring now to FIG. 1, a network 100 is shown in which various individual nodes 102 communicate with one another and exchange information. Each node comprises a device such as a computer, personal digital assistant, smart phone, etc. Each node 102 includes a DDE application 110 and one or more applications 114. The DDE application 110 enables the individual to create and manage his own class tree hierarchy. The DDE applications 110 and 107 (FIG. 3) also function as the message delivery mechanism to communicate (request and source) DDE messages and data back and forth in the network 100 via a communication network 104 (e.g., local area network, wide area network, etc.). The applications 114 may comprise web browsers or other applications that implement core social web site functionality. The DDE applications 110 interact amongst themselves to implement the security principles described herein to secure the social web site and its interaction with others. The applications 114 also interact with the DDE application 110 to further implement the security principles described herein.

Each DDE application 110 implements the class tree hierarchy as created and modified by the respective user. During operation when sending and receiving messages containing UCC and class tree segments throughout network, the DDE applications 110 ensure compliance with the digital rights specified by each user. Each DDE application 110 traverses its hierarchical class tree for a UCC object class, object instance, and security profile that aligns with the security profile embedded in a received message (such as a request for UCC or UCC digital rights data), where that embedded security profile identifies the requesting user and secure social web site service, and subject UCC. If found, the DDE application 110 validates the located security profile, and if valid, services the message, resulting in a response message being generated, a response secured with a security profile as discussed here. If a security profile is not found, or is found but is not valid, then the message or its content is outside of the allowed domain or security policy and the requested service is not performed. The receiving DDE executes a policy defined "policy violation" procedure.

Hardware

Figure 2:
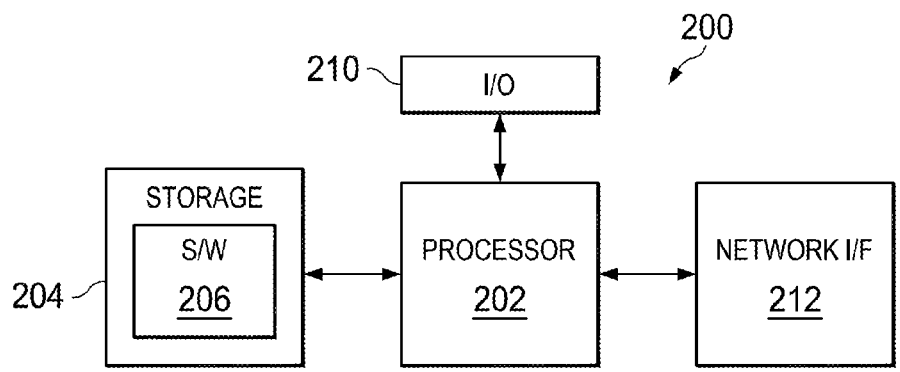
FIG. 2 shows a block diagram of an illustrative computer on which any of the software described herein can be stored and run.

Each of the various DDE applications 110 and applications 114 may be implemented on a computing device such as a desktop computer, laptop computer, notebook computer, handheld device, smart phone, server, etc. FIG. 2 illustrates a computing device 200 suitable for implementing one or more the DDE applications 110 and applications 114 disclosed herein. The computing device 200 includes one or more processors 202 that are in communication one or more computer-readable, non-transitory, storage devices 204. Computer-readable, non-transitory storage device 204 may include volatile memory such as random access memory (RAM), as well as non-volatile storage such as read-only memory (ROM), hard disk drive, flash storage, etc. The computing device 200 may also include an input/output (I/O) device (e.g., display, touchscreen, keyboard, mouse, etc.) and a network interface 212. The storage 204 contains software 206 that is executed by processor 202. Software 206 may include the DDE application 110 as well as the various applications 114. By executing the software 206, the processor is able to perform some or all of the functionality described herein.

The DDE Applications

For the embodiment of FIG. 1, each DDE application 110 interfaces to corresponding applications 114. One or more of the applications 114 may comprise, for example, browsers and core social web site applications that may implement, for example, a social web and will be discussed in that illustrative context below. The use and interaction of the applications 114 and the DDE application 110 implements a secure social web site in which each individual is in full control of the digital rights of his UCC—e.g., its use, accessibility, etc.

Each DDE application 110 implements or incorporates a hierarchical class tree for the storage and retrieval of security profiles within its visibility. The content and structure of this class tree implements a model driven architecture of the owning user's social web presence, including his digital rights policy. Each DDE application 110 and its hierarchical class tree is a "touch point" into the secure social web enabling dynamic control and visibility into data as the data moves between social web applications of various users—what the data is, who (e.g., which user entity) is utilizing the data, what version of the data is in circulation, which application 114 or DDE application 110 is permitted to access and use the data, where the data has been and is going, and how it is displayed and processed. This information is framed within a security-centric model driven architecture that is instantiated by object class information stored throughout the distributed data dictionary (multiple interacting DDEs), a piece of which is resident within any particular DDE application 110.

In various embodiments, each DDE application 110 injects a security profile into each SOAP message 104 that travels between applications 114. As SOAP messages are transmitted to other applications 114, the DDE application 110 associated with each destination application 114 examines the message for the security profile to determine whether the message is valid within the context of user entity, message, and service. Each DDE application 110 is operable to communicate with each other DDE application 110 in a fashion that is transparent to the core social web site functions (114) and/or users of the web site.

In the context of a secure social web, each user is able to create and manage a hierarchical tree structure (as will be described in detail below) that is imbued with security profiles that implements whatever digital rights the user desires. For another application 114 on a receiving node to be able to access a particular user's UCC, a portion of the hierarchical tree pertaining to that particular UCC is provided to the DDE application 110 of the receiving node. In some embodiments, the DDE application of user A must provide at least a portion of his hierarchical tree structure to the DDE application 110 of user B. User B may desire to access UCC pertaining to user A. User B, however, will not even be aware of what UCC is available to be accessed without User A's hierarchical tree structure. With that hierarchical tree structure of User A, User B may request a certain type of access to certain UCC of user A (e.g., viewing of certain photographs). User B's DDE application 110 makes the determination as to whether to grant the desired access based on an analysis of the received hierarchical tree structure of User A. If User B does not have the hierarchical tree structure of User A, then User B will not be able to access User A's UCC. Additionally, even with the hierarchical tree structure of User A, User B still may be denied access based on the digital rights policies embedded in the received hierarchical tree structure of User A.

The security of a social web-enabled process may be managed according to defined "states" by identifying and tracking (through the DDE applications 110) each and every secure social web activity executed across the network. Each secure social web activity involving messaging across the network is assigned a security profile; each security profile is assigned a unique Globally Unique Identifier (GUID). The activities add to a security profile, including the creation, identification, transportation, and processing of data as security artifact objects. Each object has a unique tag, and the tag is unique based on a multi-part structure that provides for a unique identifier administered by a registration process that occurs in the DDE application 110. In addition, because an object belongs to a class and any given class may have many instances, in the DDE application 110 the instances are given unique version identifiers used to identify the version. In this fashion, the multi-part structure also stores the version number that, in conjunction with the class identifier, provides for a unique global object instance identifier. The multi-structure identifier also has a geopolitical identifier that is an additional unique structure for the purpose of identifying a user (individual or organization) that may have political boundaries as defined by the user. The geopolitical identifier thus conveys the concept of ownership. The geopolitical identifier may be used for export control compliance and other political conditions necessitating retention of specific control designation at the identifier level.

The management of these security profiles is accomplished with the DDE instance associated each application 114. All metadata is maintained by the DDE, as is instance data (the user's actual UCC). All are identified by Globally Unique Identifier tags, organized in a model drive object-oriented architecture, and implemented using a DDE.

The DDE is a database-embedded engine that contains a data dictionary for metadata; it has as a set of components and services that are designed to define, identify, manage, expose, and archive UCC, digital rights, and security objects. Objects in the engine have an intrinsic representation based on entities and relationships between entity types. These entities form a database design containing: Object Class, Data Class, Action Class, Behavior Class, Relationship Class, Object Instance, and Data Instance. Each class is supported by a class tree with inheritance, refinement, and sub-classing rules established and refined by an expert user (Data Architect). Data Instance and Object Instance are instantiations of classes and represent the embodiment of the real world as framed by the class imposed architecture. The data dictionary defines a class tree that may implement, for example, a secure social web, and a user's secure social web presence.

The hierarchical class tree defined by the model driven architecture includes security profiles and represents, for example, a secure social web. When relationships between, for example, the objects in the social web change, the changes are then captured by modifications to the class tree in the corresponding DDE application 110.

The DDE application 110 provides the functionality to establish, preserve, and evolve the definition of all class trees and instances. It is used to drive and support the functionality of a metadata repository, such that one instance of a metadata repository is operable to elaborate a digital rights policy and project a digital rights policy of an individual's social web onto a security profile embedded in data messages and services. Each instance of a DDE can communicate with another DDE instance for the purpose of exchanging information and functionality as defined by the model driven architecture captured within the class tree. The class tree is thus the method of defining what the DDE will operate on, and with, to implement the defined social web presence (e.g., who can see what content of the user, what they can do with that content, etc.). Each user is able to create and edit their own class tree, and thus manage the content, and behavior, and security of his secure social web presence. The end presence is what is sought because the engine will execute whatever object class methods are available and consistent with the objects involved in the various requests for content within the social webs.

Figure 3:
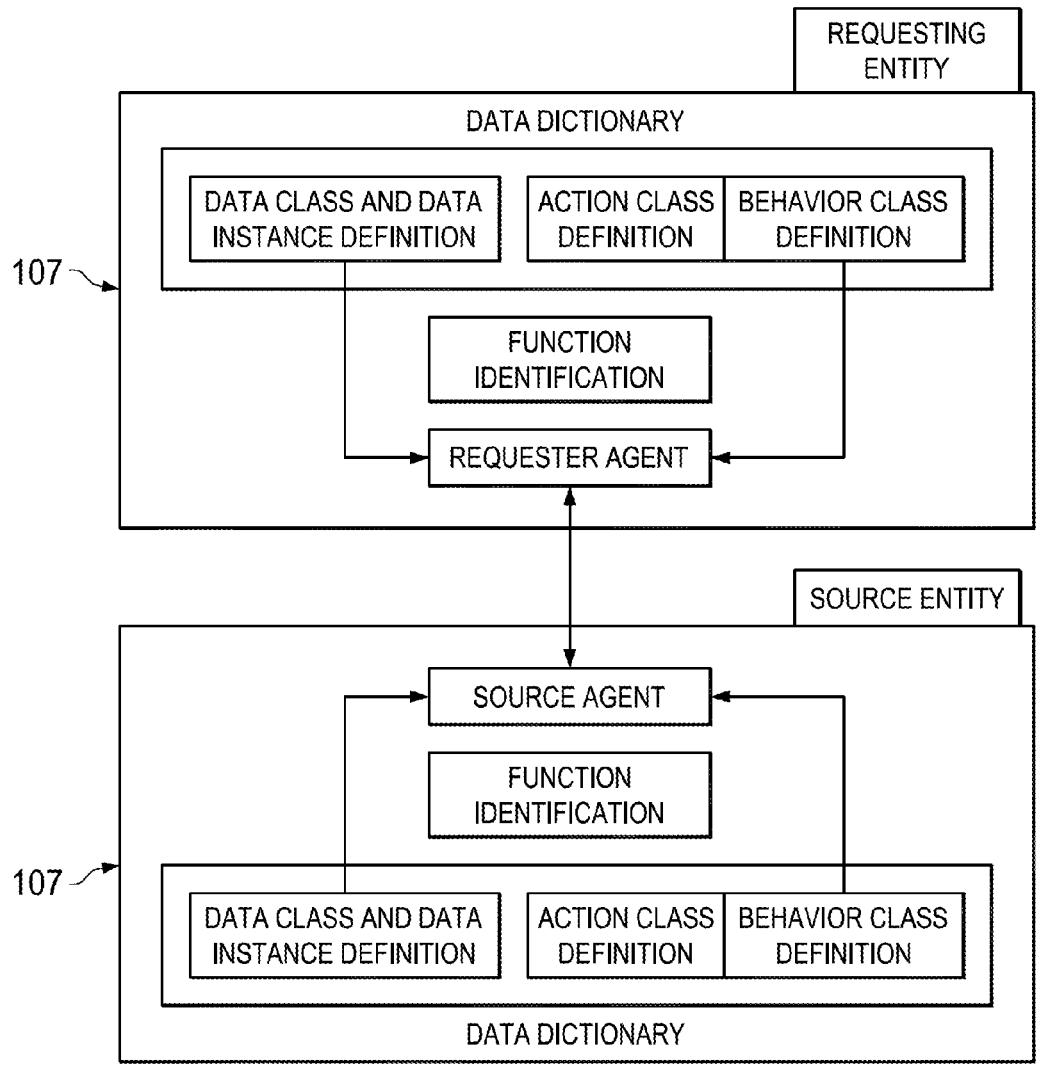
FIG. 3 illustrates a block diagram of two data dictionary engines (DDEs) interacting with each other.

As illustrated in the diagram of FIG. 3, the DDE 107 establishes a platform for the definition and collection of secure social web models and security profiles that, in turn, establish the domain (area of emphasis) for class tree elaborations. The security domain is thus established as part of the class tree configurations. The DDE processes object and class information, providing the ability to identify, collect and manage specific security information throughout an "end-to-end" digital rights model.

Each security profile embedded by the DDE application 110 is a managed object instance, belonging to a parent class that is in the UCC object class tree consistent with user's UCC security profiles.

The security profiles embedded at the data-level maintain a security profile with a corresponding security profile designator. The security profile includes at least three types of information assignments: the data security profile, the user security profile, and the service security profile. The security profile comprises a set of encoded permissions, privileges, and selected quality hierarchy according to the three types of information.

The Data Security Designation may comprise one or more of the following designations: Source-of-record ("SOR"), clone ("C"), persistent ("P"), and temporal ("T"). The Services Security Designation may consist of one of the following designations: generate ("G"), destroy ("D"), consume ("C"), provide ("P"), request ("R"), own ("O"), and archive ("A"). The User Security Designation may consist of one of the following designations: own ("O"), read ("R"), write ("W"), delete ("D"), proxy-for ("PF"), proxy-to ("PT"), execute ("E"), keep ("K"), subclass ("S"), and archive ("A"). Each designation may be selected by the owner of data upon making it available on the network 100.

Activity associated with each and every profile may be tracked throughout the use of the social webs, thereby accomplishing management, audit, and billing (if applicable) at the system level. The degree and manner of the management of a security profile is defined by the articulation of a digital rights policy. The articulation of a policy may be accomplished by class tree elaboration, bringing the existence of policy profiles into relationship with IT infrastructure artifacts and data resource artifacts.

Each class instance includes details about ownership, permissions and authority for interaction with other class instances. At each interaction, security profile verification is conducted for compatibility (i.e., a comparison is performed between security profiles), thus allowing the interaction to complete as defined. If the interaction is not supported because of security profile violations, then the interaction is tracked, logged and processed according to the violation class.

Each message containing a security profile is comprises at least two artifacts: the data artifact containing the XML elements, attributes, and associated XML articulations constituting a valid XML document, and the security profile artifact also articulated as a valid XML document. The security artifact also contains the artifact identifier and other naming and version control components that identify the artifact as it exists at the enterprise level.

From a systems-centric view, a secure social web implemented via the class tree disclosed herein has a number of positive implications for the secure social web site. One positive implication is that system is readily scalable and user activity is easily monitored. Businesses have learned hard lessons traveling down the bumpy social media road while trying to grow their bonuses and straining to turn a profit. A common theme continues to be scalability and the inability to earn a sustainable profit off of user activity as opposed to dependence on advertising revenue, income from job ads, etc. Early social media solutions did not scale well, technically or fiscally, resulting in system outages, data compromises, and lost opportunities and customers. Massive, costly, crash software development and deployment efforts had to be undertaken quickly, with the inevitable bugs, system outages, and data leaks.

In comparison, the model driven architecture disclosed herein and its class tree model implementation provides for a high degree of scalability. Every aspect of the system—data and metadata representation, class tree organization, configuration control and versioning, the sharing and transport of tree branches, the definition and navigation of relationships; the incorporation of security profiles into message headers and their verification via virtual services—are all centered around large-scale distributed processing with localized autonomy yet with centralized administration, while continuously maintaining data confidentiality, integrity, and availability. A social web built on these capabilities shares the same scaling ability. In addition, due to the class tree architecture with its engrained versioning and configuration management features, navigation of a user through the tree, and changes made to tree branches and its nodes by the user, can be tracked, or metered, with ease and at multiple degrees of detail. User activity can be monitored at the data object level. Profitability can be derived as the enterprise can accurately assess the cost factors incurred by a user-instigated change, allowing the enterprise to charge the user for moving and keeping artifacts on a "per use" approach. Revenue can be further enhanced through licensing of the DDE instances associated with each user, be it an instance located on a user's personally owned device, or hosted at a third-party or in the cloud. This costing modeling is ideal for any community of interest that realizes the benefit of additional security that comes with a secure social web. Such communities of interest would include, for example, financial organizations (e.g., Wall Street, banking, insurance), government (e.g., federal, state, military), law enforcement, and just about every type of commercial business. The secure social web could be implemented as a sophisticated enterprise social network or as a business social web. A secure business social web, one that can be trusted by both the enterprise and the user, could bring about fundamental change and improvement in the way that people share, connect, and learn at work. A company could bring change and improvement in the way it connects to and engages people—employees, customers, and partners.

Operation of the Class Tree

Figure 4:
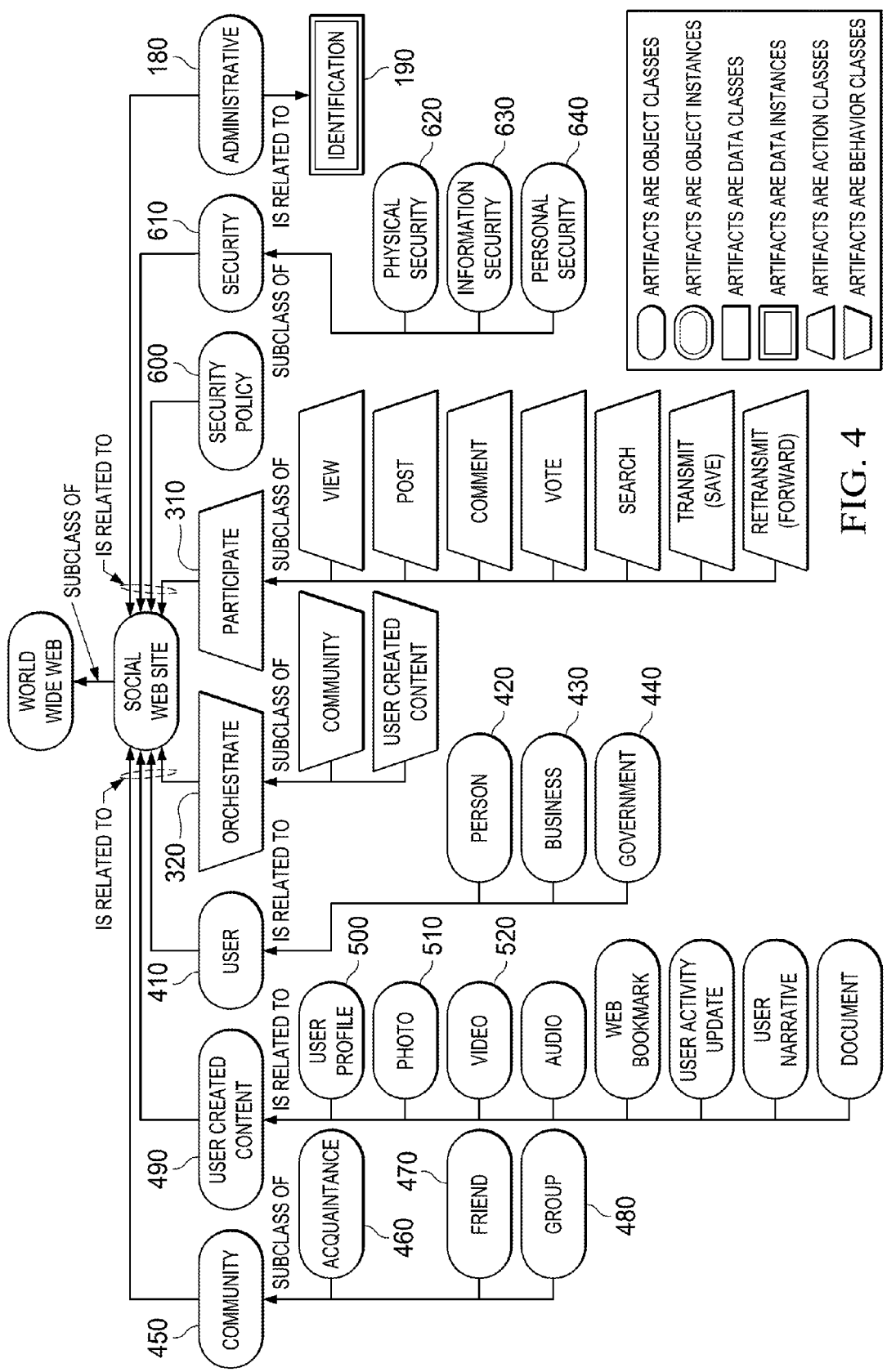
FIG. 4 depicts a secure social web specific hierarchical class tree, at the system digital rights policy level, consisting of an aggregation of multiple classes to create super classes, classes that contain digital rights policy classes (including security profile objects), UCC object classes, and other secure social web site object classes.

FIG. 4 shows an illustrative hierarchical class tree structured to model a typical secure social web site. A digital rights policy, its application to UCC, and the structure, organization, and behavior of the user's secure social web presence is represented by a model captured by this hierarchical class tree structure, each node of the tree being a model object representing one of a number of object types, or classes—the object class, the data class, the action class, and the behavior class. There are also instances of data classes, represented by the data instance entity, as well as an object instance entity to store object class instances used to define other object classes.

The content of a class tree hierarchy contains and collectively elaborates upon digital rights policy object classes and UCC object classes. A UCC object class is defined as an object class that describes the data and associated methods used to represent and process UCC objects. The aggregation of multiple classes creates super classes, classes that contain digital rights classes, UCC classes, and security profiles, and any other class tree segments needed to capture and operate a user's secure social web presence. The hierarchy of the total class tree represents a total architecture with a coarseness gradient beginning at the top and traversing towards the bottom; digital rights policy fidelity increases as does the fidelity of the aggregated UCC data as the object class tree is traversed from top to terminal node. Each tree branch manifests an increasing fidelity until one or more terminal nodes are found where the rights data is held, and in the case of a super class, where UCC data is also held; this is the class instance data. Security profile data is held with the UCC data at the terminal nodes and reflects a digital rights evaluation of the UCC data based on associated digital rights policy application. This evaluation is given a digital rights structure which is the security profile defined in U.S. Pat. No. 7,647,627.

Within a secure social web configured DDE hierarchical class tree, data classes and data instances respectively representing the data attributes (i.e. data definitions) and data aggregates (the structures containing the actual real world data). Both these data artifacts have relationships to the object class, with the object class providing the necessary representation (definition) of the object of interest. There are also instances of object classes, object instances, as well as data classes and data instances; all are used to define other object classes.

Figure 7A:
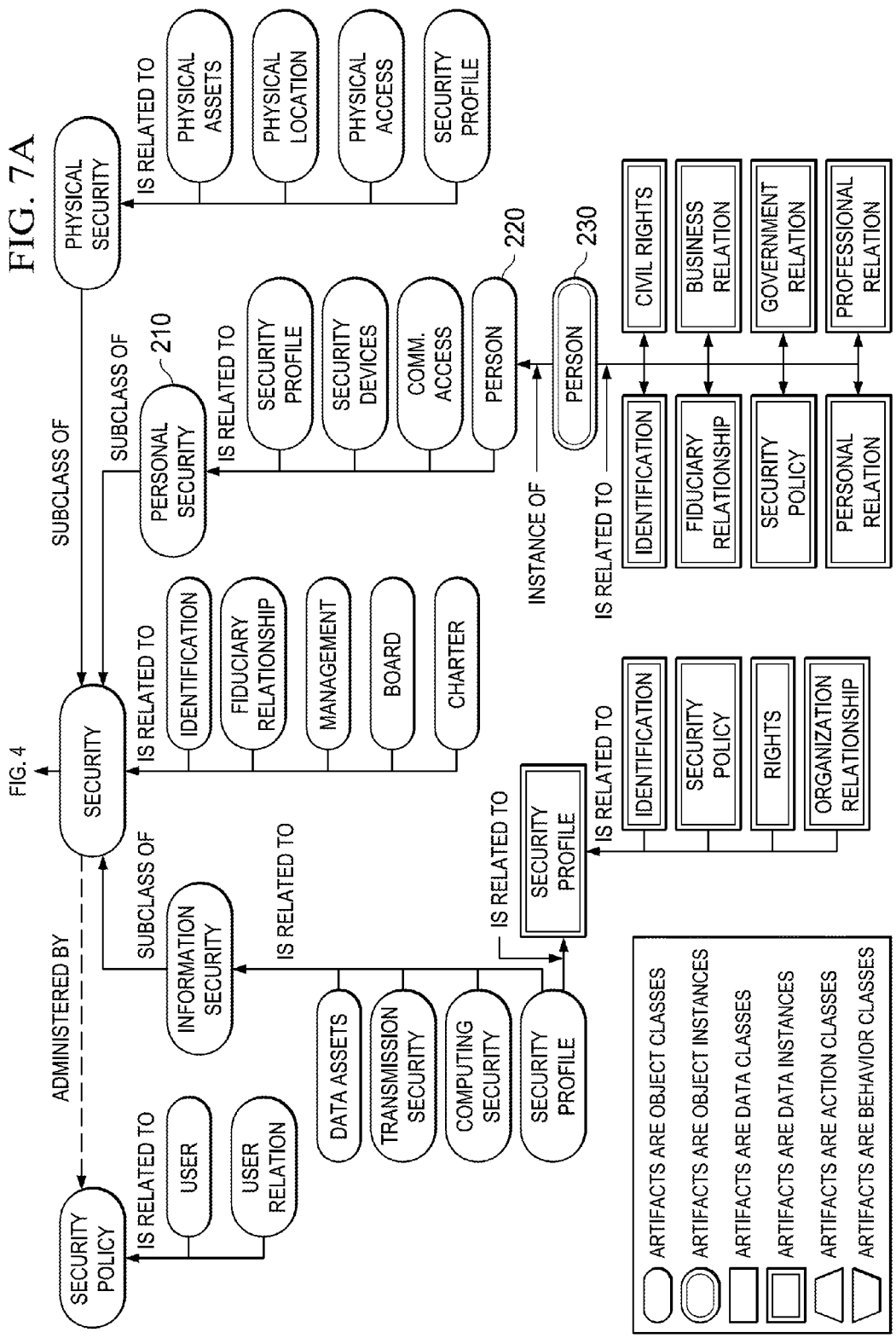
FIGS. 7A and 7B depicts hierarchical class tree segments used to capture digital rights (security profile and digital rights policy) data and metadata that encompasses a user's secure social web presence.
Figure 7B:
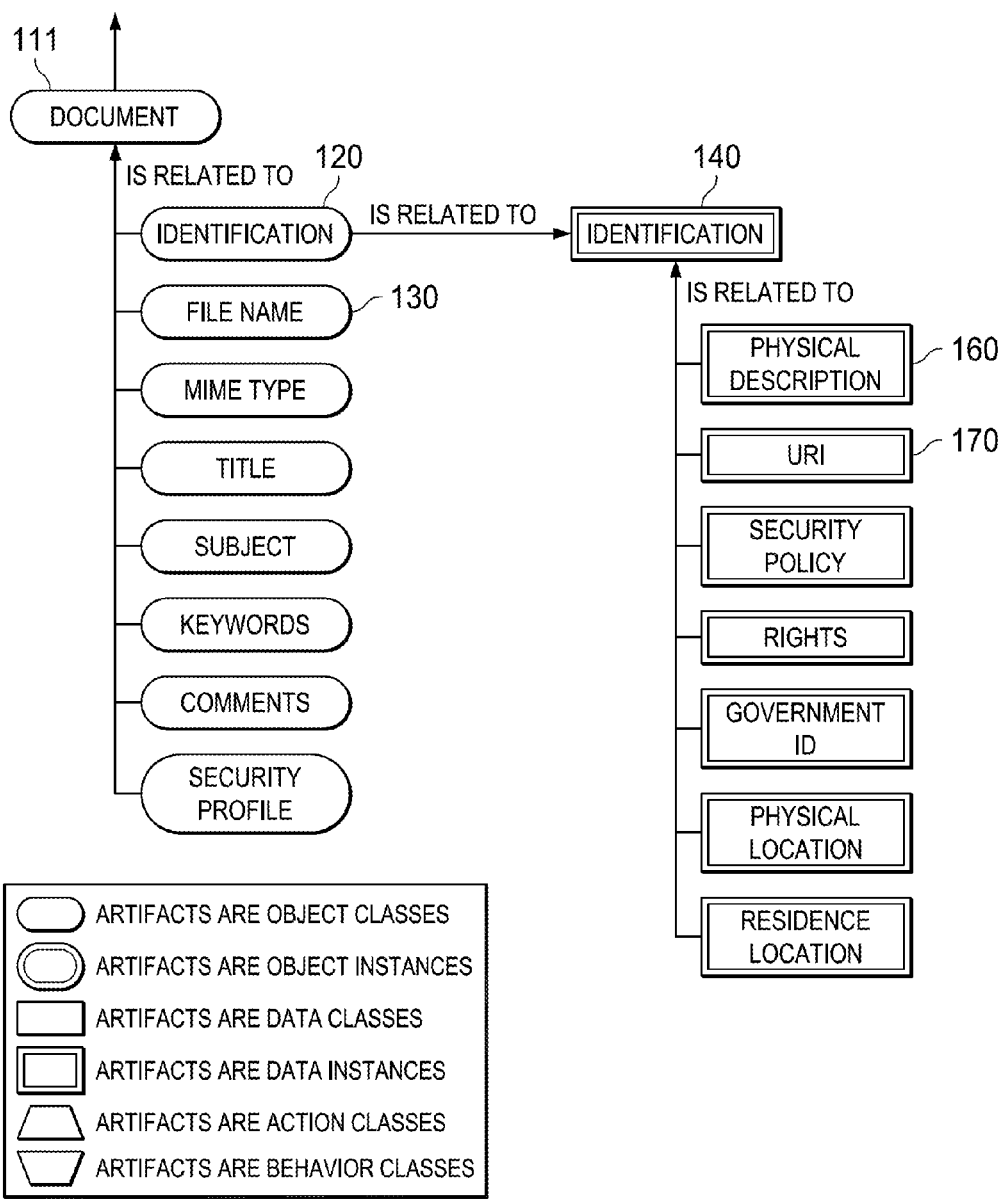

The object classes 'identification 120', 'file name 130', etc. are related to the object class 'Document 111 (FIG. 7).

Figure 5:
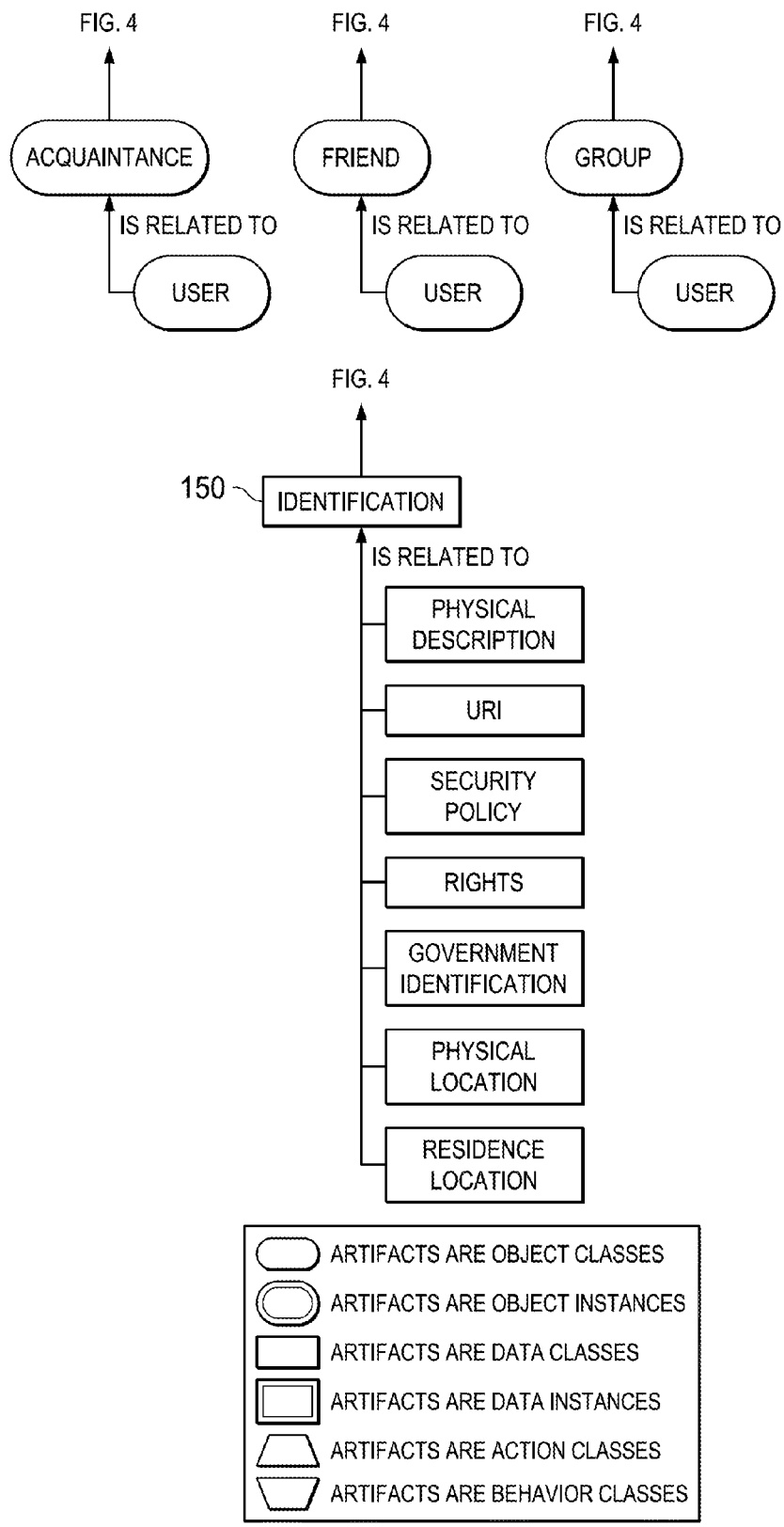
FIG. 5 depicts hierarchical class tree segments, or sub-trees, used to identify, and capture data and metadata about, secure social web site user communities of various types.

The 'identification 150' data class (FIG. 5) is used as the "template" to instantiate an 'identification 140' data instance (FIG. 7), with data about an actual "real-world" identification. It is tied to the 'Document 111' object class due to its relationship with object class 'identification 120', which is related to the 'Document 111' object class.

The data instances 'physical description 160', 'URI 170', etc. (FIG. 7) are instantiations of their like data classes (the details of which are not shown), which themselves are subclasses of some not shown parent data class.

An instantiation of data class 'identification 150' (FIG. 5) is another 'identification 190' data instance (FIG. 4[AA]), which is related to object class 'Administrative 180'

Figure 6:
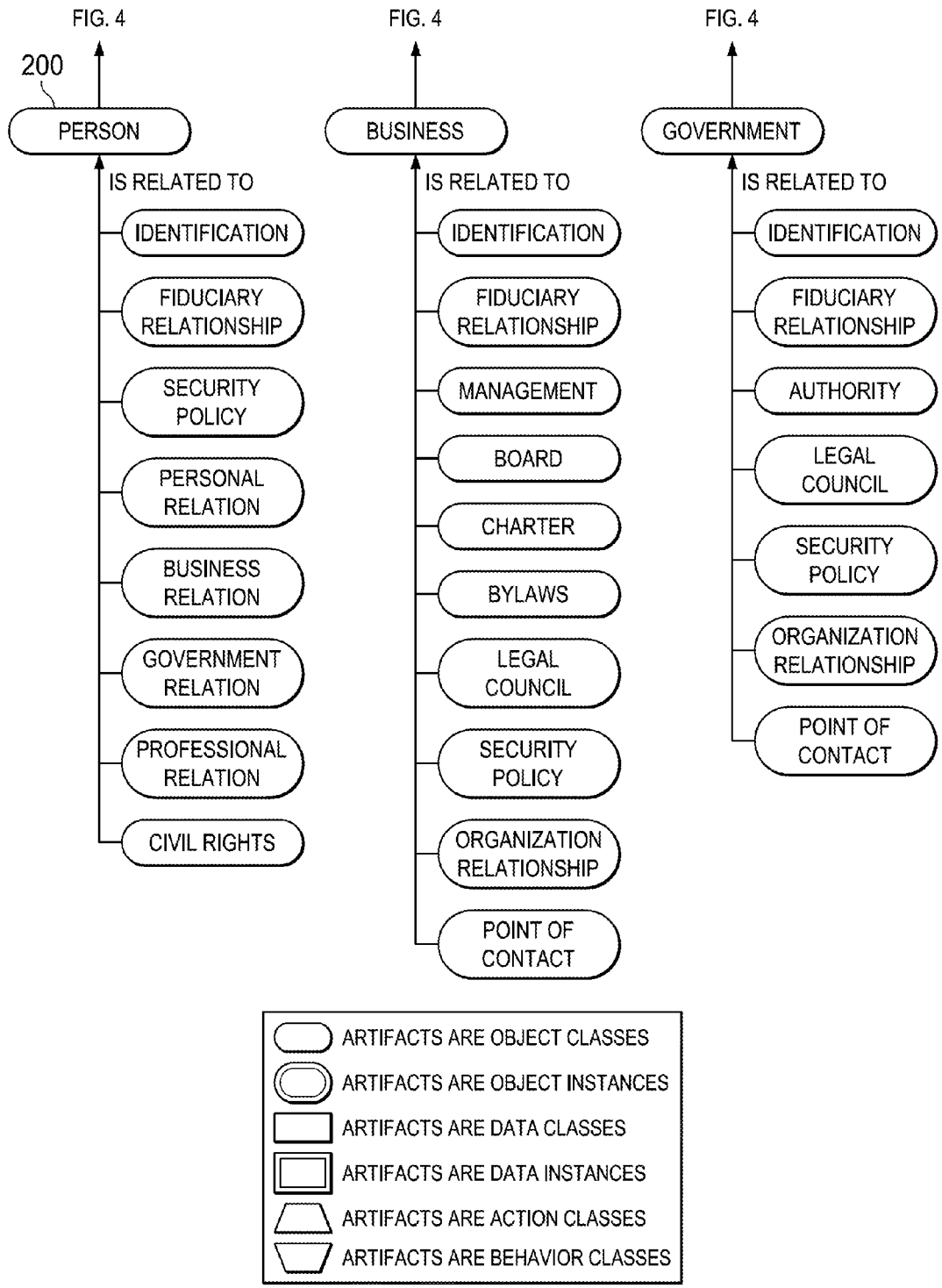
FIG. 6 depicts hierarchical class tree segments used to capture data and metadata about secure social web site users of various types.

The 'Person 200' object class (FIG. 6) is shown to relate to the object class 'Personal Security 210' in FIG. 7 via 'Person 220'. An instantiation of this class is show, as the 'Person 230' object instance. The 'Person 230' object instance is related to the 'Personal Security 210' object class due to the 'Person 220' object class relationship to object class 'Personal Security 210'.

Subclassing is the means to refine and inherit attributes of parent classes. Subclassing results in a hierarchical tree structure. Establishing relationships between classes is a separate activity, one that builds a mesh, or network, that is "laid over" the hierarchical tree. This mesh models the real world by interconnecting tree classes that are the components of the real world. This real-world model is "locked down" for any one particular individual, web site, etc., through instantiation, creating instances from their defining (and interconnected) classes. For example, relationships can reflect how classes and their instantiations interact with each other to perform a specific task or generate a specific product, or perform a specific process in a string of processes. Within the context of a social web, a product could be the User Created Content (UCC) of a social web site user, and a process could be the methods (action classes) used to display that content, within the bounds of the security policy set by the individual (which is another product with its corresponding methods). Every data artifact for an object is described in this way and only those parameters that are necessary are defined. Without these data definitions the real world data cannot be captured for the object.

A fully completed tree capable of supporting relationships that model the real world includes action classes, such as 'Participate 310' (FIG. 4), and behavior classes, such as 'Orchestrate 320', associated with the object classes. These additional class tree branches provide the processing methods, procedures, and code if necessary, to support the object class to which they are related, they apply process to their peer data classes. Action classes are containers for actual executable computer code/procedure (I.e. methods). The behavior class represents the relationships of a set of objects classes used to model the real world and how these objects classes interact with each other to perform a specific task or generate a specific product. It captures expected behaviors of action classes given specific data instances, essentially providing a state machine view of how the related action class(es) will behave given inputs as characterized by the related data instances. The behavior class also captures how the related object classes, as an aggregate, behave as a system. It is an encapsulation of all the piece parts reflecting the "object machine" behavior based on the state of the environment being modeled, and the state of the machine, at any given time, within that environment. Given this capability the behavior class can specify the steps in a complex process that sub-classes of behavior perform in a specific order, based on the dynamic state driven aspect of the encompassing object class. Applied to process control, for example, an object class, or aggregation of object classes, has a relationship with one or more behavior classes that detail how the process is controlled and what the resulting states should be.

Taken in total, a fully completed tree as shown in FIGS. 4-7 with an overlaid network, represents a network of object classes, data classes, action classes, and behavior classes. The network (or mesh) of class artifacts built by relationships between objects within the tree is not a tree but rather represents a relationship structure "laid over" a class tree structure defining some real world object (a complex one encompassing data, process, behavior) within the domain captured by the class tree.

The Table below provides illustrative definitions of the various components of the tree depicted in FIGS. 4-7.

| Number | Term | Definition |
|---|---|---|
| 111 | Document (object class) | An object class that captures the definitions used to collect the data associated with a generic digital document ('URI' 170, file type, last modified, size, etc.). |
| 120 | Identification (object class) | An object class that captures the definitions used to uniquely identify an arbitrary object within the context of the real world (vs. a context of just the social web site) for one or more interacting secure social web sites. Through relationships to other objects, it allows definition of identification data such as 'physical description' 160, 'URI' 170, government id, physical location, etc. |
| 130 | File name (object class) | An object class that captures the definitions used to identify the name of a digital document, be it a generic 'document' 111, a photo '510', etc. A file name is almost always a subset of a 'URI' 170, however a URI may encode the file name to remain with a legal character set. |
| 140, 190 | Identification (data instance) | A data instance that captures the unique identity an arbitrary object within the context of the real world (vs. a context of just the social web site) for one or more interacting secure social web sites. Through relationships to other data instances (instantiations of various data classes), it captures identification data such as 'physical description' 160, 'URI' 170, government id, physical location, etc. |
| 150 | Identification (data class) | A data class that captures the definitions used to uniquely identify an arbitrary object within the context of the real world (vs. a context of just the social web site) for one or more interacting secure social web sites. Through relationships to other objects, it allows definition of identification data such as 'physical description' 160, 'URI' 170, government id, physical location, etc. |
| 160 | Physical Description (data instance) | A data instance that captures the unique physical description an arbitrary object within the context of the real world (vs. a context of just the social web site) for one or more interacting secure social web sites. |
| 170 | URI (data instance) | A data instance that captures the unique Uniform Resource Identifier (URI) of an arbitrary object within the context of the real world (vs. a context of just the social web site) for one or more interacting secure social web sites. A URI is a string of characters used to identify a name or a resource in an Internet compatible form. Such identification enables interaction with representations of the resource over a network using specific protocols. |
| 180 | Administrative (object class) | An object class that captures the definitions used to collect data of an administrative nature for the configuration, operation, and maintenance of a secure social web site. |
| 200, 220, 420 | Person (object class) | An object class that captures the definitions used to uniquely identify an individual person within the context of the real world (vs. a context of just the social web site, see 'user profile' 500) for one or more interacting secure social web sites. A person object class is related to other object classes that define the actual attributes of that individual ('identification' 120, relationships, etc.). |
| 210, 640 | Personal Security (object class) | An object class that captures all aspects of the personal security (security profiles, security devices, etc.) of a secure social web site person. |
| 230 | Person (object instance) | An instantiation of a 'person' object class 200 that captures the attributes of an actual real-world individual person that is a member of one or more interacting secure social web sites. The 'person' object class 200 defines the structure and behavior of the 'person' object instance 230. |
| 310 | Participate (action class) | An action class containing methods (i.e. machine executable methods and services), captured as subclasses, that when invoked via relationships to objects, conduct computing sequences for tasks such as viewing UCC, posting UCC, voting amongst users, conducting searches through UCC, etc. |
| 320 | Orchestrate (behavior class) | A behavior class that defines, through subclasses, the behaviors (and through relationships, methods and data models) to orchestrate the secure conveyance, processing, and storage of UCC on part of users for one or more interacting secure social web sites. |
| 410 | User (object class) | An object class that encompasses, via relationships, users of one or more interacting secure social web |

-continued

| Number | Term | Definition |
|---|---|---|
| | | sites, where is user is an individual 'person' 420, a 'business' 430, or a 'government' 440. |
| 430 | Business (object class) | An object class that captures the definitions used to uniquely identify a business entity within the context of the real world (vs. a context of just the social web site, see 'user profile' 500) for one or more interacting secure social web sites. A 'business' object class 430 is related to other object classes that define the actual attributes of that business entity ('identification' 120, relationships, etc.). |
| 440 | Government (object class) | An object class that captures the definitions used to uniquely identify a government entity (federal, state, local) within the context of the real world (vs. a context of just the social web site, see 'user profile' 500) for one or more interacting secure social web sites. A 'government' object class 440 is related to other object classes that define the actual attributes of that government entity ('identification' 120, relationships, etc.). |
| 450 | Community (object class) | An object class that encompasses, via subclassing, the three forms of relationships a user had decided to make part a community ('acquaintance' 460, 'friend' 470, and group '480') spanning one or more interacting secure social web sites. A social network community represents and connects 'users' 410 to enable the communication and sharing of information ('UCC' 490) amongst the members of that community. |
| 460 | Acquaintance (object class) | An object class that encompasses, via relationships, people or organizations (users) that are established and maintained online only (i.e. not a personal relationship). |
| 470 | Friend (object class) | An object class that encompasses, via relationships, people (almost all) or organizations (rarely) that are established offline (i.e. in person) and maintained both offline and online (i.e. is a personal relationship). |
| 480 | Group (object class) | An object class that encompasses, via relationships, people or organizations ('users' 410) that are members of a special interest group (a particular hobby, a common alma mater, etc.) |
| 490 | User Created Content (object class) | An object class that encompasses, via relationships, digital material developed, authored, and controlled by a secure social web site 'user' 410. |
| 500 | User Profile (object class) | An object class that captures the definitions used to collect the personal data associated with a specific user. It is the explicit digital representation of a person's identity within the context of one or more interacting secure social web sites. |
| 510 | Photo (object class) | An object class that captures the definitions used to collect the data associated with a digital photo ('URI' 170, file type, when taken, size, etc.). |
| 520 | Video (object class) | An object class that captures the definitions used to collect the data associated with a digital video ('URI' 170, file type, when taken, duration, etc.). |
| 600 | Security Policy (object class) | A superclass object class that captures the attributes of the security policy applied to a secure social web site. |
| 610 | Security (object class) | A superclass object class that captures all aspects of the security (auditing, controls, methods) of the secure social web site. |
| 620 | Physical Security (object class) | An object class that captures all aspects of the physical security (physical assets, location, access methods, etc.) of the secure social web site and its contents. |
| 630 | Information Security (object class) | An object class that captures all aspects of the information security (data assets, transmission security, computing security, etc.) of the secure social web site and its contents. |

Applied to Secure Social Web

FIG. 4 shows the above-mentioned concepts and methods applied to a Secure Social Web. The multiple branches of the shown class tree are used for class refinement, branches for object classes, another for data classes (none shown), another for action classes (only one shown—'Participate 310'), and yet another for behavior (only one shown—'Orchestrate 320'). Together this creates a large tree with the root at the top. The upper part of the tree contains system level nodes with client level nodes found below as one traverses down the branches as defined in MetaSecure U.S. Pat. No. 7,647,627 "System And Methods For Secure Service Oriented Architecture" and as elaborated upon within pending patent (May 2010) "Policy Directed Security-Centric Model Driven Architecture To Secure Client And Cloud Hosted Web Service Enabled Processes". Finally at the bottom or end node of the branches one has the entire real world data set, object and data instances, associated with their parent object class superclass.

This superclass object class (the entire tree in FIG. 4) is a "real world" aggregation reflecting the needed taxonomy and behavior of a social web, with artifacts added for individual centric, fine-grained, distributable, security and privacy controls. It represents what is necessary for successful and secure social web interaction between:

'Users 410'—be them an individual (a 'person 420'), a 'business 430' entity, or a 'Government 440' entity, where each user 'orchestrates 320' his . . .

'Communities 450' of 'acquaintances 460' (people only known on-line), 'friends 470' (people known face-to-face), and 'groups 480' (online discussion forums), and where each user also 'orchestrates 320' his . . .

'User Created Content 490', multi-media encompassing a 'user's profile 500' as well as 'photos 510', 'videos 520', etc., which are shared . . .

for 'participation 310' in 'communities 450' by other 'users 410' . . .

per 'security policy 600' set by the individual, policy that directs . . .

'security 610' controls—'physical 620', 'information 630', and 'personal 640' . . .

utilizing a variety of 'administrative 180' items.

All of these systems level nodes are the minimum required to operate a secure social web. Deeper in the tree, at client node levels, dynamic changes to relationships and instances will occur as a user shares, modifies, and supplements the communities, UCC, security policy, and security controls under his control. Given this ongoing change, a specific relationship "mesh" will be transient in that it only exists for a specific version of the class tree. New versions will arise as changes occur. Security is embedded throughout with every artifact of this class tree having security profile objects that are regulated for personal identity security purposes and managed by the owning user and shared with a requestor according to the agreements established between the two parties. For example, in this user-centric view, a UCC owner provides object classes owned by him/them to a recipient, a member of his community. That community member may also provide object classes owned by them. This collaboration and ownership is maintained by the two DDE instances, each one resident on their respective personal computing device (a tablet computer, a smartphone, an enterprise server (for a business user)). Through their sharing they may participate in each other's communities, within the bounds of security policy and security controls. Each DDE, owned by each user, may be maintained in a place (computing device) respectively associated directly with each user, or they may be maintained in a cloud provided by a third party.

The entire class tree or preferably a portion thereof (a sub-tree) is shared by the user that created and owns the tree using mechanisms of digital rights conveyance such that the receiving party acknowledges the ownership of the source throughout the life cycle of the information regardless of how many DDE instances are involved in the end-to-end transaction. For example, DDE application D may receive a portion of the DDE application A's tree. DDE application D keeps a copy of that tree portion but understands and maintains that that tree portion still belongs to DDE application A.

Therefore when information is requested and shared, the conveyance of ownership is assigned to the information and always maintained by the receiving DDE instances. Any changes to this conveyance and distribution must first be provided by the owning/source-of-record DDE, the first-party individual. This mapping of first-party UCC digital rights is then maintained by each first-party individual's DDE instance for the life-cycle of the data. Only with approval from the first-party individual can another party participating in the DDE network gain access to first-party individual UCC. When the requester is twice or more removed from the owning source, the request is made to the source and not via any DDE application, unless the DDE application is conveyed such digital rights by the owning first-party individual, such as the case as in the use of backup DDE instances or shadow DDE instances used for network optimization purposes. In addition, a "proxy" designation can be set up by the first-party individual, designating specific digital rights to a subsequent-party DDE instance. This subsequent-party DDE instance would function as a proxy to the first-party DDE-enabled secure social web site, such as to provide coverage when the first-party individual's DDE instance is not available.

This life-cycle approach provides a complete map of first-party individual digital rights distribution and management regardless of who the other party in a two party transaction may be. The persistence of digital rights maintained by each participating DDE is performed through collaboration between DDE instances in the network as an active agent of the first-party individual capable of rule-based decision execution following ownership fair-use conveyance as constructed by the first-party individual owning and assigned to the DDE instance. With this capability, the DDE can provide fast ownership fair-use conveyance for requests that require immediate disposition while maintaining a synchronized record of first-party individual UCC. If a digital rights rule (a policy statement) indicates that the DDE agent cannot provide authorization without the owner's intervention then a pre-described communication activity with the owner is initiated such as e-mail, telephone message, or any other automated communication method available.

The Hierarchical Class Tree

The basic topology of a hierarchical class tree is defined as having three partitions.
1: The absolute "root" node from which all class tree branches emanate.
2: The system digital rights policy level containing high-level digital rights classes in addition to first-party individual UCC level classes.
3: The client digital rights policy level containing client-based digital rights classes and digital rights policy instances. This level can also contain UCC classes and data instances and begins with a client digital rights policy level absolute "root".

Figure 8:
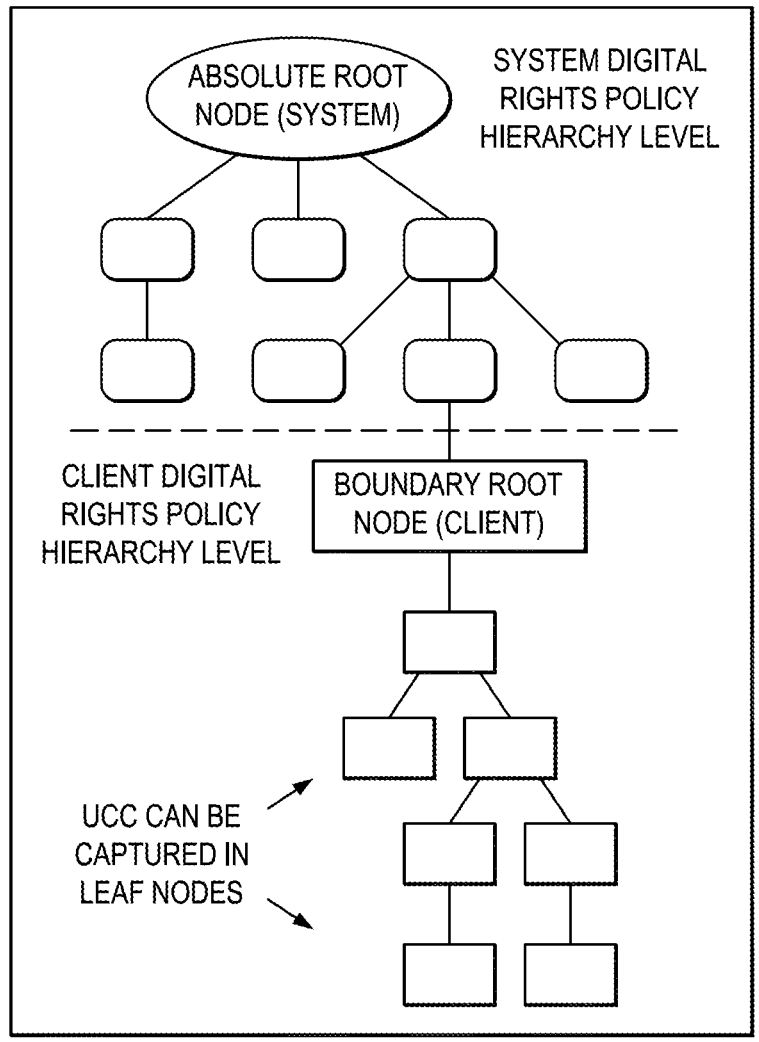
FIG. 8 shows a generic hierarchical class tree consisting of three partitioned levels, the absolute "root" node, the system-based digital rights policy level, and the client-based digital rights policy level, connected at a boundary rot node.

This basic example topology is represented in FIG. 8. It is managed within the DDE as defined in U.S. Pat. No. 7,647,627. System digital rights policy is "digital rights policy" as defined earlier, but constrained in that can only be shared intact (such as for backup or proxy) with others. Client-based digital rights policy is also "digital rights policy" as defined earlier, it's sharing is not constrained; it may include imported client digital rights policy level sub-trees from other first-party individuals.

The system digital rights partition level and client digital rights partition level together represents the first-party individual digital rights policy topology. It is administered by the first-party individual through automation maintained in his node that runs the DDE application 110. The hierarchical class tree is then shared with other entities using DDE mechanisms of digital rights conveyance, push and pull.

In FIG. 8 the hashed horizontal line is a representation of a partition between the system digital rights policy level and the client digital rights policy level. Where this demarcation is placed is dependent on how much hierarchy is provided by the first-party individual regarding system level digital rights policy; an increase in fidelity and UCC complexity is represented by longer branches on the tree (i.e. the demarcation is low in the tree hierarchy). The methodology for use of the system digital rights partition level and client-based digital rights partition has the first-party individual as the sole entity able to generate and administer content within the system digital rights partition level. The client digital rights policy level is also administered by the first-party individual, but he has the ability to import client digital rights policy level sub-trees from other first-party individuals given that the supplying DDE conveys digital rights and contributes the corresponding System Digital Rights partition level branch (s) of the object class tree. This premise also applies as well to any subsequent-party information requesters and/or information collectors. Imported sub-trees can be viewed and modified by the receiving first-party individual.

Where there is robust system digital rights policy level definition, more and higher fidelity opportunity for integration exists with a client digital rights policy because parent class availability for adoption leads to client-based refinement, where allowed (i.e. there is more system digital rights policy tree for the client to connect to, and refine from). The concept of adoption is where an imported parent class or relationship class can be used to gain established definition and methods for digital rights policy at the receiving client digital rights policy level. The concept of flexibility is manifested when adopting an imported parent class that allows for sub-classing definition by refinement and sub-classing rules enforcement based on definitions in the imported class. These flexibility mechanisms (adoption, refinement) are DDE capabilities. In refinement, class inheritance may be deleted or refined so that the attributes can be altered, or maybe defined to prohibit any subsequent refinement.

The end of any particular system digital rights policy tree branch and the top, or start, of a client digital rights policy tree is represented by a node defined as a "boundary node". A boundary node is an identity type node with a security profile structure; it is both the terminal node of a system digital rights policy tree branch and the boundary "root" node of the attached client digital rights policy tree (FIG. 8). The significance here is that the client digital rights policy tree boundary root node is also the identity node for the client digital rights policy tree. This identity node contains information used to identify the client digital rights policy tree to the system digital rights policy hierarchical service. This is beneficial for digital rights preservation when a client digital rights policy tree is imported.

The semantic and syntactic aspect of system architecture for UCC digital rights management is captured and managed in the class tree architecture hierarchy by using a DDE as explained in U.S. Pat. No. 7,647,627.

A System Digital Rights Policy Node

A System Digital Rights Policy Node is a functional entity within the DDE that defines and manages the system digital rights policy level within the Hierarchical Class Tree. It is the controlling authority providing services to Client Digital Rights Policy Nodes (described in greater detail below), primarily the rooting, or attachment of client digital rights policy level sub-trees to a system digital rights policy level tree branch. In the context of a secure social web, a System Digital Rights Policy Node is contained within:

The DDE-enabled secure social web site immediately associated with the first-party individual, used by that individual to control use and discrimination of the user's UCC.

The DDE application owned and operated by a trusted site, used by that first-part individual to backup or shadow his DDE-enabled secure social web site and DDE data dictionary instance.

The DDE instance containing first-party digital rights conveyed by the first-party individual so that it may act as a proxy for his DDE-enabled secure social web site dictionary instance.

The DDE instance (or multiple instances) owned and operated by a third-party information requester, used to model and manage their information request systems and to make available to first-party individual and second-party information collector "canned" information requests policy methods.

The DDE instance (or multiple instances) owned and operated by a second-party information collector, used to model and manage their information collection systems and to make available to first-part individual and third-party information requester "canned" information collection policy methods.

Each Metalloria instance maintains a complete record of System Digital Rights Policy Architecture Hierarchy conveyance.

Figure 9:
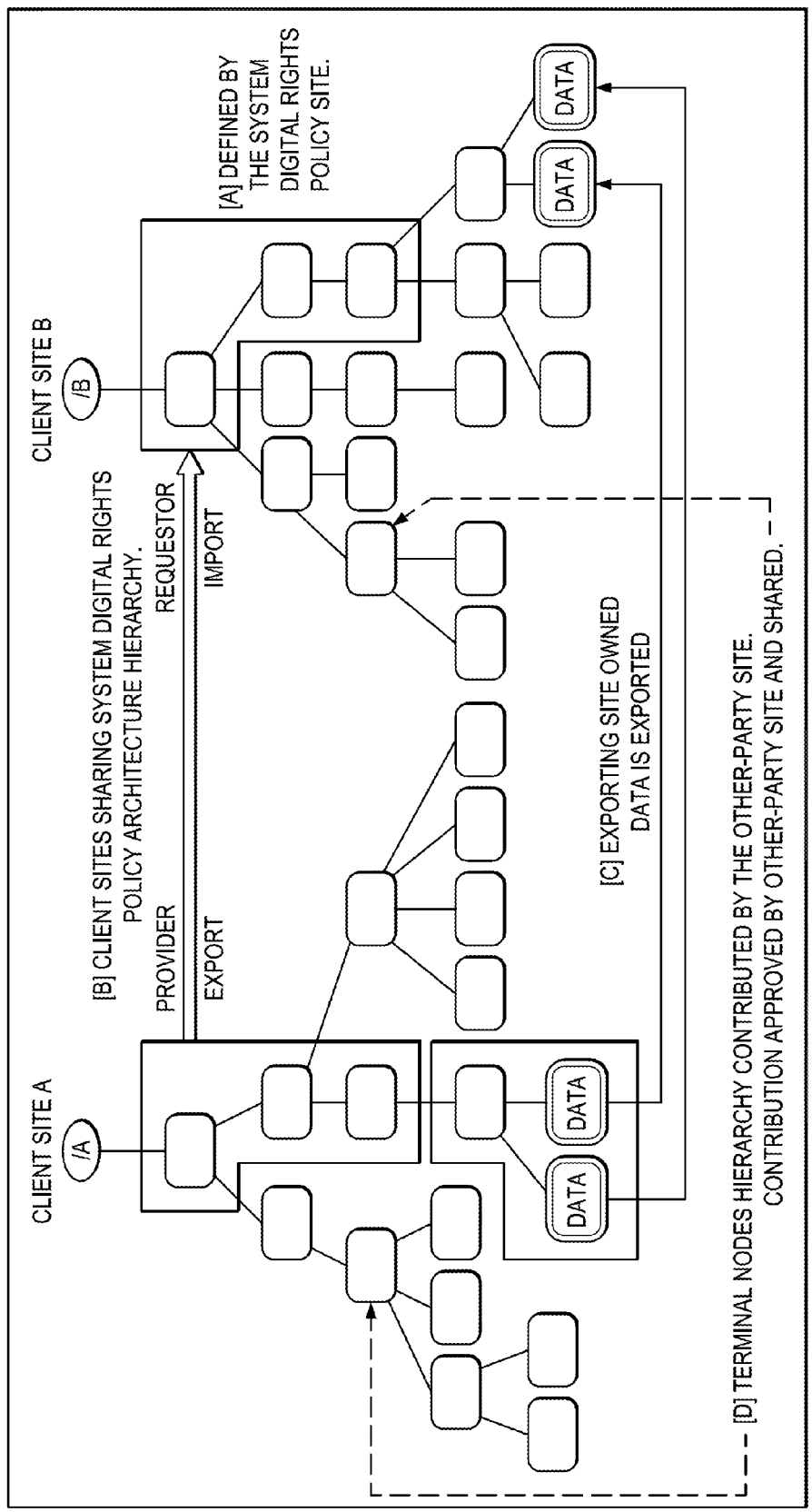
FIG. 9 shows two System Digital Rights Policy Nodes, each with a DDE instance, a system-based digital rights policy level tree branch representing a system digital rights policy hierarchy, the donation of a branch from one DDE instance to another, the exporting of host owned data, the exporting of terminal node data from one site to another, and a third-party site contribution of tree branch terminal nodes hierarchy.

In various embodiments, a function of a System Digital Rights Policy Node is to define and manage tree segments, where any one segment is established from the absolute root node down to the Client Partition level. This is shown in FIG. 9 [A]. Tree segments can be exchanged with other System Digital Rights Policy Nodes providing they are whole; that is, intact from the absolute root node to the Client Partition level (excluding the client boundary/identity node) for a specific branch of the donor System Digital Rights Policy architecture hierarchy. At [B] in FIG. 9 the donation of a System Digital rights policy Architecture Hierarchy branch is exported/imported from one DDE instance to another.

Within the preferred embodiment of the invention, the donation of a System Digital rights policy architecture hierarchy branch is performed to:

backup a DDE instance (primarily the instance associate with a first-party individual's DDE-enabled secure social web site) or shadow DDE instances for network optimization purposes.

exchange of "canned" information collection policy methods and information requests policy methods amongst System Digital Rights Policy Nodes to simplify administration and facilitate collaboration, and on the part of the first-party individual, provide a starting point for customizing his UCC digital rights policy.

The exporting of a segment from a donor System Digital Rights Policy architecture hierarchy and subsequent importing to a requesting System Digital Rights Policy architecture hierarchy site can include tree segments that did not belong to the donating site, those tree segments being owned by a source site if (1) the source site set privileges (aka security policy as captured in security profiles) that permits those tree segments to be "reexported" by the donor to the requesting site, and (2) the donor site also set privileges that permits those tree segments to be received and read the requesting site. For example, in FIG. 9 Client Site B's System Digital Rights Policy Hierarchy contains several imported system level branches belonging to other first-party DDE-enabled secure social web sites. One such export/import is FIG. 9[B]. However, migration control (i.e. the privileges that control "reexporting") of the other-party ("source") tree segments is maintained by the contributing other-party ("source") System Digital Rights Policy Node—requests for export/import must be made directly and granted explicitly by the owning System Digital Rights Policy Node. The same principal applies when requests are made for client digital rights policy level objects, as defined by client digital rights policy architecture hierarchy, that are owned by some other-party; they levy publishing rights requirements that are maintained by that other-party client's System Digital Rights Policy Node. In both cases (System level and Client level Digital Rights Policy Architecture Hierarchies), a requesting site may see the other party contribution to the tree branches requested from a site, but only the exporting site owned data is exported (FIG. 9 [C]) Again, the degree a requesting site may see the other party's contribution to the requested tree branches is controlled by policy set by the other ("source") site. The other-party site contributes the actual other-party tree segment(s) hierarchy terminal nodes corresponding to the appropriate source System Digital Rights Policy Architecture hierarchy (FIG. 9 [D]). The identity of this other-party is known only to the requesting site as the boundary node or identity node of the contributor's segment. When a request of this nature is made of a non-owner System Digital Rights Policy Node, the site request is forwarded to the owner of the System Digital Rights Policy Architecture Hierarchy.

A System Digital rights policy architecture hierarchy site may reside in a cloud as a service providing system digital rights policy services exclusively as a digital rights service cloud. It may have other UCC services integrated with the digital rights policy as described earlier in the Hierarchical Class tree section. Equivalent use of the methods described here applied to cloud computing modeling and security is discussed in patent application Ser. No. 12/778,750 "Policy Directed Security-Centric Model Driven Architecture to Secure Client and Cloud Hosted Web Service Enabled Processes", incorporated herein by reference.

A Client Digital Rights Policy Node

A Client Digital Rights Policy Node is a functional entity within the DDE that manages the client digital rights policy level of the Hierarchical Class Tree. This management involves enforcing client digital rights policies for the individual or organization that originally created a client digital rights policy level sub-tree and agreed to share it with the first-party individual defining and managing the parent System Digital Rights Policy Node. Note that the "client" can be the first-party individual that also controls the parent System Digital Rights Policy Node; he/she/they are their own client. Describing the context of this patent, a Client Digital Rights Policy Node is contained within:

the DDE-enabled secure social web site (and its DDE data dictionary instance) immediately associated with the first-party individual, used by that individual to model digital rights policy for his UCC. In this case, the 'client' is the first-party individual, a person (an organization of one).

the DDE instance owned and operated by a trusted organization, used by the first-part individual to backup or shadow his Data dictionary enabled secure social web site DDE data dictionary instance. In this case, the 'client' is the trusted organization.

the DDE instance containing first-party digital rights conveyed by the first-party individual so that it may act as a proxy for his dictionary instance. In this case, the 'client' is the organization responsible for the proxy DDE instance, most likely a business organization.

the DDE instance (or multiple instances) owned and operated by some other DDE enable secure social web site, used to model and manage their social web presence and to make available to first-part individuals and other DDE enable secure social web site "canned" digital right policy methods. In this case, the 'client' is the "some other" DDE enable secure social web site, a business organization.

the DDE instance (or multiple instances) owned and operated by another secure social web site user, used to model and manage their secure social web presense and to make available to first-part individuals and other DDE enable secure social web sites there digital rights policy and UCC. In this case, the 'client' is this additional first-party individual.

Each DDE instance maintains a complete record of Client Digital Rights Policy Architecture Hierarchy conveyance. In some or all cases, the client class tree hierarchies that make up the Client Digital Rights Policy Node are attached to the System Digital Rights Policy Node tree segments resident within the same DDE data dictionary instance. The client class tree hierarchy has a designated boundary root node from which all tree branches emanate. The boundary root node has inherent properties (identity class) that allow for the connection of the node (and underlying class tree) to an existing System Digital rights policy Architecture Hierarchy branch, as mentioned earlier. From this generic class a series of branches are defined that, if desired, will encompass the client's (as defined above) entire definition for processes and data associated with the application of digital rights policy to UCC. This definition can take place in segments and is allowed to mature over time to represent increasing scope and growth of UCC data, its uses, producers, and consumers. Each class definition has built in a set of subclasses for digital rights policy and security profile definition.

The donation of a Client Digital Rights Policy Architecture Hierarchy branch may be performed to:

backup a DDE instance (primarily the instance associate with a first-party individual's DDE-enabled secure social web site) or shadow DDE instances for network optimization purposes.

exchange of "canned" digital rights policy methods policy methods amongst Client Digital Rights Policy Nodes to simplify administration and facilitate collaboration, and on the part of the first-party individual, provide a starting point for customizing his UCC digital rights policy.

enable sharing of digital rights policy protected UCC between first-party individuals by first agreeing to share (export/import) the corresponding digital rights policy as captured within the exported Client Digital Rights Policy Architecture Hierarchy branch.

establish a connection point between the System Digital Rights Policy Architecture Hierarchy and one or more Client Digital Rights Policy Architecture Hierarchy(s).

There are cases when a single System Digital Rights Policy Architecture Hierarchy terminal node is connected to one or more Client Digital Rights Policy Architecture Hierarchy boundary root nodes. This reflects the adoption of a System Digital Rights Policy Architecture Hierarchy by different Data dictionary enabled secure social web sites; as in the case of institutional membership identification, as an example. Nevertheless, a Client Digital Rights Policy Architecture Hierarchy will only contain one boundary root node, identifying the Data dictionary enabled secure social web site linked to the System Digital Rights Policy Architecture Hierarchy that may be owned by the same Data dictionary enabled secure social web site.

UCC Messaging And Security

System and Client digital rights policy architecture hierarchy is shared in order for data and services to flow between DDE enabled secure social web sites. DDE instance to DDE instance process flow represents site-to-site connectivity and provides for a controlled distribution of services (digital rights policy) and data (UCC). If an applicable message or transaction does not exist in the digital rights policy architecture hierarchy it cannot be sourced by a provider, communicated, or be requested and processed by a consumer. This is an important control mechanism that prevents an user from exceeding the scope of UCC data distribution as defined by digital rights policy set by the first-party individual (i.e. they can't do something with an individual's UCC that is not permitted by his digital rights policy). It's also a powerful information security mechanism as well; UCC data messages will not be able to come from or be sent to sites that are not predefined by policy. The application-enabled component of a client's UCC process, no matter where it is located in the cloud, or outside the cloud, is described and orchestrated by the data dictionary model capturing the client digital rights policy hierarchy. Digital rights orchestration is defined by UCC generation and collection process models integrated with digital rights; it is the first part of the data and process life-cycle and fundamental to all subsequent activity. Client digital rights policy hierarchy segment visibility is shared at every level and across boundaries and web sites facilitated by the system digital rights policy hierarchy site(s), but process and data distribution is only allowed based on the client digital rights policy architecture hierarchy and associated security profile assigned therein; a pre-established security profile between requestor and provider.

Operational Description

A new UCC data item or method is defined in the DDE data dictionary where it is registered and ownership rights are granted. A security profile is also established based on the location of the data item in the digital rights policy architecture hierarchy established in the DDE instance where the data dictionary is hosted. If methods are developed for processing the data these also are defined in the data dictionary and given ownership rights and assigned security profile attributes, just like for data. The determination, if this new material is local in scope and not published, is controlled by the establishing digital rights policy architecture hierarchy. Publishing is allowed when the requisite publishing requirements are addressed, at which point the new artifacts can be shared consistent with security profile settings. These setting are examined by every participating DDE in the source to destination path. If the security profile is consistent with the path, the data and methods are allowed to proceed from DDE to DDE until the requestor is reached.

In order for DDE nodes to stay current with digital rights policy changes, new security profile information is exchanged when existing security profile information is declared obsolete. Only DDE instances having that portion of the digital rights policy architecture hierarchy, contained in their respective data dictionaries, and thus affected by the change, are involved in the update. Updates can also be invoked by digital rights architects when digital rights anomalies are encountered by the system where operator intervention is immediately required. Certain digital rights policy anomalies can also be "canned" or programmed as a set of rules for automatic execution without operator intervention.

Digital rights policy architecture scope can be expanded at any given DDE site provided that the site requesting new digital rights policy hierarchy scope has a security profile consistent with the source of the requested expansion. This expansion is a form of adoption and potential refinement. The expansion can be initiated by a user or a process through collaboration with the DDE site responsible for the source of the request and the source of the response.

Methods for processing anomalies are digital rights applications that function as listeners or on-demand services invoked by the digital rights policy hierarchy and represented as action classes and behavior classes in the data dictionary within each DDE. Some of these methods may be distributed and collaborate as internal DDE background tasks between DDE instances. They can function as independent tasks invoked by anomalies encountered during DDE transactions and can initiate third party digital rights functionality if the digital rights policy hierarchy has the necessary object classes representing third party digital rights software interfacing.

What is claimed is:

1. A storage device containing machine-readable instructions for implementing a secure social web and that, when executed by a computer, cause the computer to:
   create a hierarchical class tree implementing security profiles, wherein said hierarchical class tree identifies data and actions pertaining to content, and said security profiles restrict access and use of a first user's content, wherein the hierarchical class tree includes a system digital rights tree portion and one or more client digital rights tree portions attachable to the system digital rights tree portion;
   map a hierarchical class tree segment into the hierarchical class tree by attaching the hierarchical class tree segment as a client digital rights tree portion to the hierarchical class tree system digital rights tree portion, wherein the mapped hierarchical class tree segment pertains to a second user's content, and records and implements digital rights owned and controlled by said second user; and
   display said hierarchical class tree with the mapped hierarchical class tree segment.

2. The storage device of claim 1 wherein said machine-readable instructions, when executed by the computer, cause the computer to distribute a segment of said first hierarchical class tree to another computer for use to implement at least one security profile of said first user.

3. The storage device of claim 1 wherein said machine-readable instructions, when executed by the computer, cause the computer to distribute a segment of said hierarchical class tree to another computer, said distributed segment comprising data classes, action classes and security profiles.

4. The storage device of claim 1 wherein said content comprises at least one of digital photographs, documents, network navigation history, and purchasing history.

5. The storage device of claim 1 wherein the one or more client digital rights tree portions are attachable to the system digital rights tree portion via a boundary node, the boundary node containing information to identify the client digital rights tree portion to the system digital rights tree portion.

6. The storage device of claim 1 wherein said received hierarchical class tree segment includes an identity node that provides identification information used for the mapping.

7. The storage device of claim 1 wherein said machine-readable instructions, when executed by the computer, cause the computer to limit access to content associated with said second user as specified in said mapped hierarchical class tree segment.

8. The storage device of claim 1 wherein the actions comprise any one or more of view, post, comment, vote, search, transmit, and retransmit.

9. The storage device of claim 1 wherein the hierarchical class tree comprises object classes that include any one or more of acquaintance, friend, group, user profile, photo, video, audio, web bookmark, user activity update, user narrative, document, person, business, and government object classes.

10. A method, comprising:
    creating, by a first computer, a hierarchical class tree implementing security profiles, wherein said hierarchical class tree identifies data and actions pertaining to content, and said security profiles restrict access and use of a first user's content, wherein the hierarchical class tree includes a system digital rights tree portion and one or more client digital rights tree portions attachable to the system digital rights tree portion; and
    exporting, by the first computer, a portion of said hierarchical class tree to a second computer as an exported hierarchical class tree segment.

11. The method of claim 10 wherein said content comprises at least one of digital photographs, documents, network navigation history, and purchasing history.

12. The method of claim 10 further comprising receiving a segment of a hierarchical class tree from another computer, said received hierarchical class tree segment pertaining to a second user and implementing security profiles defined by said second user.

13. The method of claim 12 further comprising mapping the received segment into the created hierarchical class tree.

14. The method of claim 12 further comprising limiting access by said first computer to content associated with said second user as specified in said received hierarchical class tree segment.

15. The method of claim 10 wherein creating the hierarchical class tree comprises creating a class tree that comprises object classes that include any one or more of acquaintance, friend, group, user profile, photo, video, audio, web bookmark, user activity update, user narrative, document, person, business, and government object classes.

* * * * *